Dec. 8, 1964                W. HUNTER ETAL                3,160,394
                            ASSEMBLY FIXTURE OR JIG
Filed July 12, 1962                                   2 Sheets-Sheet 1

INVENTORS.
WILLIAM HUNTER
GERARD A. NAAB
BY
AGENT

Dec. 8, 1964
W. HUNTER ETAL
3,160,394
ASSEMBLY FIXTURE OR JIG
Filed July 12, 1962
2 Sheets-Sheet 2
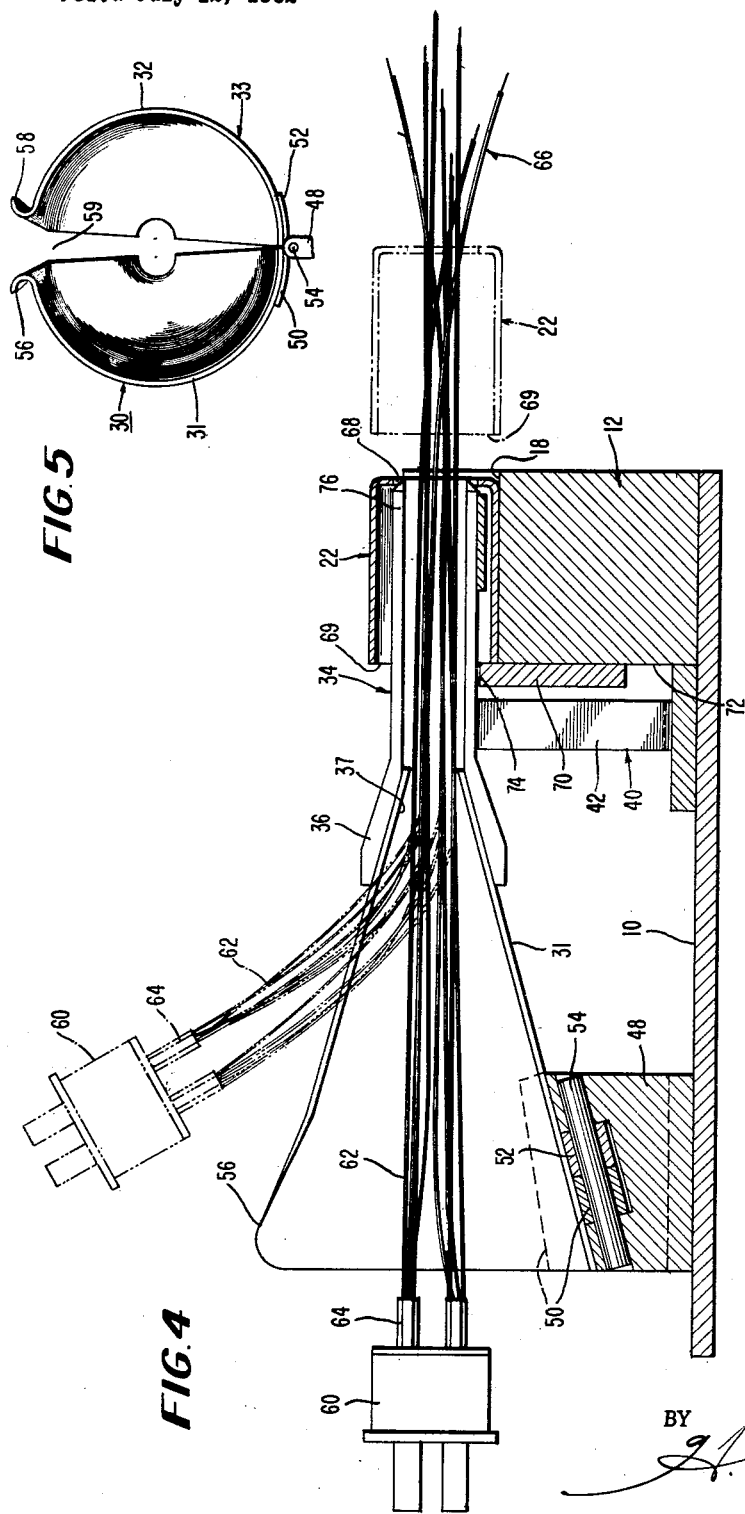
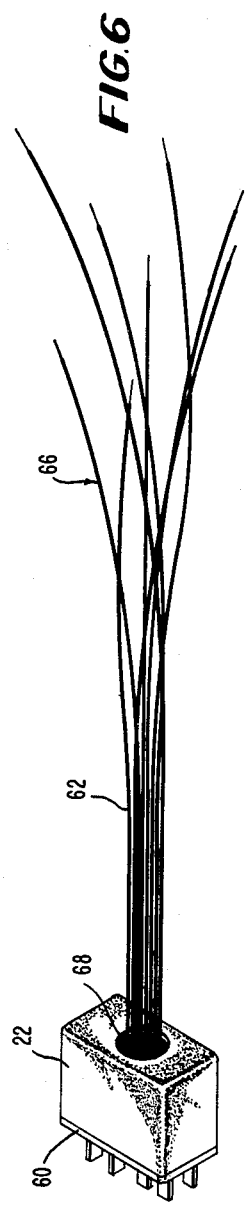
INVENTORS.
WILLIAM HUNTER
GERARD A. NAAB
BY
AGENT

United States Patent Office 3,160,394
Patented Dec. 8, 1964

3,160,394
ASSEMBLY FIXTURE OR JIG
William Hunter, Upland, and Gerard A. Naab, Morton, Pa., assignors to Brewer Pharmacal Engineering Corporation, Upper Darby, Pa., a corporation of Pennsylvania
Filed July 12, 1962, Ser. No. 209,386
2 Claims. (Cl. 254—134.3)

The invention hereinafter described and claimed has to do with jigs or fixtures for assemblying a number of wires or cables with associated apparatus. More particularly, the invention is concerned with an assembly device for facilitating the passage of the ends of a plurality of wires or cables of random terminal lengths and arrangement through a restricted aperture in apparatus with which the wires or cables are to be associated or assembled.

While the invention is of broader applicability, it is especially useful in the assembly of terminal blocks comprising a base member to which wires are attached, and a cover member secured to the base member and covering the terminals to which the wires are attached and having a restricted aperture through which the wires extend. Many times the wires extending from the terminal block are of different lengths and the various ends terminate at different distances from the block and each other in splayed disarray. To pass the wire ends through the restricted aperture in the cover, thereby to thread the cover down over the wires and on to the terminal block during assembly, is a very vexing and time consuming procedure because the ends must each be handled separately to align it with the hole in the cover as the cover progresses along the wires.

The primary object of the present invention is to provide an assembly apparatus or jig overcoming the problem in connection with such assembly procedures whereby the randomly spaced and disarrayed ends of such groups of wires are quickly and efficiently aligned with a restricted aperture in associated apparatus with which they are to be associated.

More specifically, it is an object of the invention to provide an assembly jig overcoming the problem of aligning randomly-spaced ends of a group of wires with an aperture in the cover member of a terminal block to which the opposite ends of the wires are secured whereby the cover member may quickly and easily be threaded over the wires and secured to the terminal block in a manner covering and protecting the ends secured to the block.

Another object of the invention is the provision of such an assembly fixture which is characterized by its simple, inexpensive and rugged construction.

In accordance with the foregoing objects, and first briefly described, the invention comprises a funnel-like member formed by two shell-like half-sections secured together in a manner permitting relative movement therebetween whereby wires may be drawn lengthwise through its walls so that a member secured to the terminal ends of the wires may bypass the funnel as the assembly is drawn through the jig.

Other objects and many of the attendant advantages of this invention will be readily appreciated as the same becomes better understood by reference to the following detailed description, when considered in connection with the accompanying drawings wherein:

FIG. 4 is a sectional view taken along the line 4—4 of FIG. 1.

FIG. 5 is a fragmentary end elevational view of the assembly jig looking from its left-hand side as seen in FIG. 1, and FIG. 6 is a perspective view of a wire harness assembled through the use of the invention.

Figure 1:
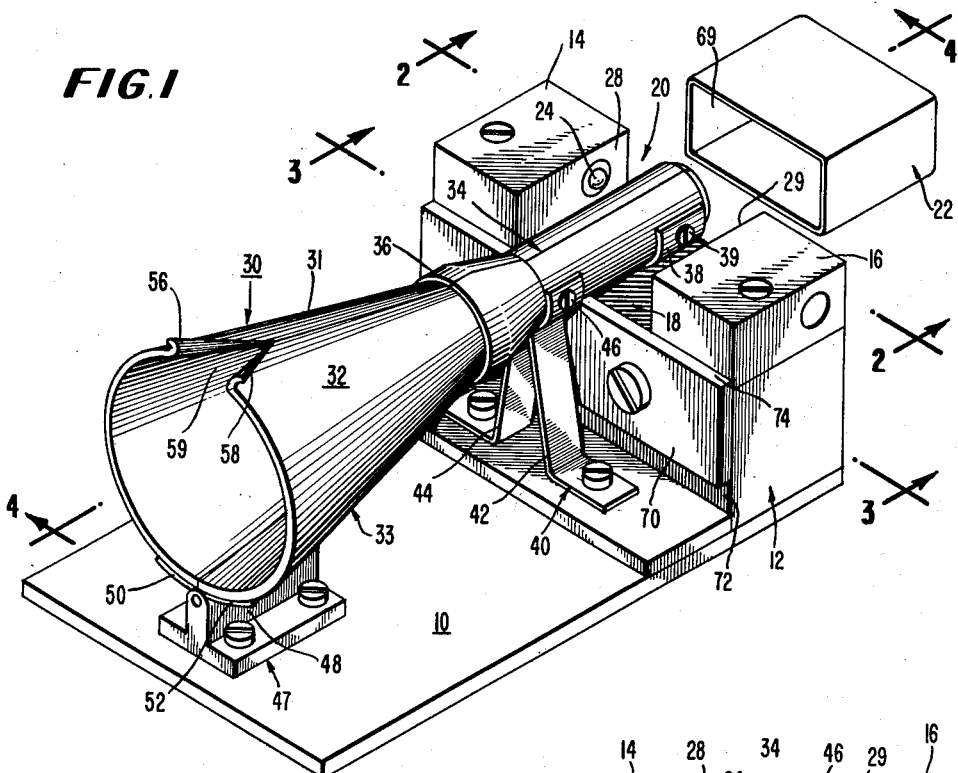
FIG. 1 is an isometric view of apparatus embodying the invention.
Figure 3:
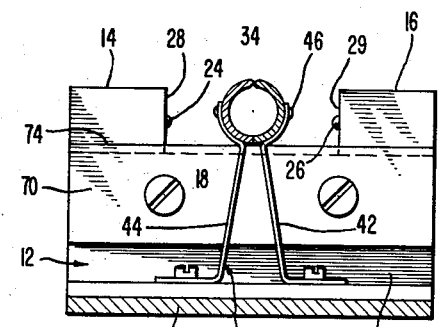
FIG. 3 is a sectional view taken along the line 3—3 of FIG. 1.
Figure 2:
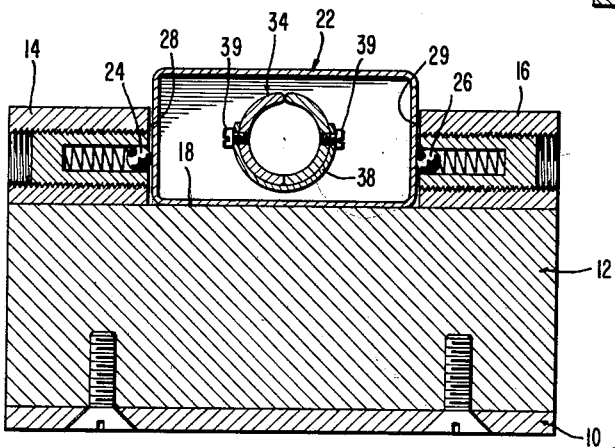
FIG. 2 is a sectional view taken along the line 2—2 of FIG. 1.

As shown in FIG. 1, it is seen that the illustrated embodiment of the invention comprises a base 10 having an upwardly extending standard 12 at one end thereof. While it may be otherwise constructed, in this form, the standard terminates at its upper end in a pair of blocks 14 and 16 spaced from each other and cooperating with the top surface 18 of the standard 12 to form a recess 20 for receiving the device through which the wires are to be threaded, such as the terminal block cover member 22. Resiliently biased ball-like elements 24 and 26 are mounted in the blocks 14 and 16, respectively, as seen in FIG. 2, with the balls extending inwardly toward each other from the inner surfaces 28 and 29 of the blocks 14 and 16 in a manner releasably to retain the cover 22 in position on the standard 12.

The funnel-shaped member 30 comprises two shell-like half-sections 31 and 32 assembled to form a hollow cone-shaped portion 33 and a tubular portion 34 extending therefrom. The tubular section 34 is provided on its left-hand end with a flared collar 36 to which the restricted end 37 of the conical portion is secured, as by welding or otherwise.

The two half-sections 31 and 32 are retained in their funnel-like assembly by spring means comprising a C-shaped spring clip 38 secured around the outer end of the tubular portion, as by screws 39, and a pair 40 of flexible members or legs 42 and 44 having their upper ends conforming to the shape of and secured to respective half-sections of the tubular portions, as by the screws 46.

The conical half-sections are hingedly secured at their outer ends to a hinge 47 comprising an upwardly extending standard 48, and hinge leaves 50 and 52 pivotally mounted on standard 48 as by the hinge pin 54.

The upper forward edge of each of the conical sections is turned or rolled backwardly, as indicated at 56 and 58, thus to form a guideway 59 to facilitate the passage of a group of wires longitudinally through the walls of the funnel-like assembly, as described below.

As seen in FIGS. 1 and 4, the outer or right-hand end of the tubular portion of the funnel extends into the recess 20 in a manner spaced above the top face 18 of the standard 12 and, in this case, centered between the inner faces 28 and 29 of the blocks 14 and 16.

Now, let it be assumed that it is desired to assemble the cover member 22 on the terminal base 60 to which the group of wires 62 are secured, as by the terminal pins 64, in a sub-assembly with the terminal ends of the wires, as indicated at 66, terminating in splayed disarray at different distances from each other. It will be realized, of course, that to pass these ends through a restricted aperture, such as shown at 68 in FIGS. 4 and 6, would be a rather tedious, trying, and time-consuming job. However, with the present fixture, it is a simple and extremely rapid operation enabling the assembly of such devices in a fraction of the time previously necessary.

In the process of assembling a cable sub-assembly such as mentioned above with the fixture of the present invention, the left-hand ends of the wires are first attached to the terminals 64 of the base member 60. The cover member 22 is slipped into the recess 20 until the edge forming its open end 69 contacts the stop member 70 secured to the inner or left-hand face 72 of the standard 12 with its upper edge 74 extending above the top surface 18. The width of the cover is such as to fit between the inner surfaces 28 and 29 of the blocks 14 and 16, and be resiliently held by pressure of the balls 24 and 26 resiliently urged against the side walls of the cover. With the cover so positioned, its aperture 68 is closely aligned with the outer end 76 of the tubular portion of the funnel, as shown more clearly in FIG. 4. The randomly-arranged loose other ends of the wires are then generally aligned with the wide opening of the funnel member and then inserted thereinto and moved to the right as seen in FIGS. 1 and 4. The conical walls of the funnel force the ends 66 of the wires more closely together in a manner guiding them into and through the tubular end 34 and the opening 68 in the cover member 22.

As clearly seen here, it would be impossible for the terminal base member 60 to pass through the funnel, therefore the wires 62 are bent upwardly, as shown in broken line in FIG. 4, and between the upper edges of the two half-sections, or shells, the rolled edges 56 and 58 guiding the wires into this area, after which the base member 60 is moved to the right, the wires passing longitudinally, or axially, through the side walls of the funnel where the sections 31 and 32 abut along its top surface, the spring and hinge members 38, 40 and 47 permitting the abutting edges of the half-sections 31 and 32 to separate, thus to accommodate the wires. As the wires pass longitudinally or axially along the abutting edges of the sections, to the right, they finally contact the edge of the open end 69 of the cover 22 and strip it from the standard 12. At this stage of assembly all wire ends are through the cover aperture 68, and therefore it is only necessary now to slide the cover the remaining distance over the wires onto the base member 60 to which it may be attached, either by set screws or other suitable means, thus completing the cable sub-assembly as seen in FIG. 6.

While the invention has been described in detail in connection with the assembly of this cable sub-assembly, it is obvious that it is useful in other applications, such, for example, as threading the wires through a tube, in which case the tube is aligned with tubular end 76 of the funnel, or it may be slipped over the end. In the latter event, it will be understood, of course, that the diameter of the tube would be larger than the tubular portion of the funnel member to permit the two half-sections 31 and 32 to separate, as shown in FIG. 5, thus to permit the wires to pass through the walls of the funnel member as described above.

Other modifications within the scope of the inventive concept herein presented, are also contemplated. For example, the tubular portion 34 may be eliminated in cases where the apertured member of an assembly is of sufficient size, or construction, to make it unnecessary.

What is claimed is:

1. A fixture for assemblying components with a group of wires wherein one end of each of the wires is connected to one element of the component and a second element thereof is to be threaded over the loose other ends of the wires through an opening in said second element, comprising:
    (a) a base;
    (b) an elongated funnel-like element comprising:
        (1) a pair of elongated shell-like half-sections abutting along opposing longitudinal edges to form a hollow cone having a wide opening at one end and a narrow opening at the other,
        (2) means secured to each of said half-sections at said narrow opening to form a tubular extension to said cone; and
        (3) means at one pair of abutting edges securing said half-sections together for limited relative movement at the other pair of abutting edges, said means comprising,
            (3a) a hinge carried by said base with its leaves secured to said half-sections,
            (3b) flexible elements each secured at one end to one of said half-sections and at its other end to said base, and
            (3c) a flexible clip having ends secured to each of said half-sections; and
    (c) means on said base for supporting said second element with its opening closely aligned with the outer end of said tubular extension, whereby said other ends of said wires may be fed into said wide opening of said cone and be guided thereby through said narrow opening, said tubular extension, and said opening in said element.

2. A fixture for assembling components with a group of wires wherein one end of each of the wires is connected to one element of the component and a second element thereof is to be threaded over the loose other ends of the wires through an opening in said second element, comprising:
    (a) a base;
    (b) an elongated funnel-like element comprising,
        (1) a pair of elongated shell-like half-sections abutting along opposing longitudinal edges to form a hollow cone having a wide opening at one end and a narrow opening at the other,
        (2) means secured to each of said half-sections at said narrow opening to form a tubular extension to said cone, and
        (3) means at one pair of abutting edges securing said half-sections together for limited relative movement at the other pair of abutting edges, said means comprising,
            (3a) hinge means carried by said base with its leaves secured to said half-sections, and
            (3b) flexible means normally urging said half-sections together; and
    (c) means on said base for supporting said second element with its opening closely aligned with the outer end of said tubular extension, whereby said other ends of said wires may be fed into said wide opening of said cone and be guided thereby through said narrow opening, said tubular extension, and said opening in said element.

References Cited in the file of this patent

UNITED STATES PATENTS

| | | |
|---|---|---|
| 2,045,884 | Sundback | June 30, 1936 |
| 2,258,745 | Dewey et al. | Oct. 14, 1941 |
| 3,038,702 | Trunnell | June 12, 1962 |